United States Patent [19]
Drexler

[11] Patent Number: 5,970,108
[45] Date of Patent: Oct. 19, 1999

[54] METHOD AND APPARATUS FOR DETECTING HIGH VELOCITY ALPHA PARTICLES HAVING CAPTURED ELECTRONS

[76] Inventor: Jerome Drexler, 25440 Becky La., Los Altos Hills, Calif. 94022

[21] Appl. No.: 09/015,707

[22] Filed: Jan. 30, 1998

[51] Int. Cl.[6] .................................................. G21G 1/10
[52] U.S. Cl. ........................ 376/195; 376/201; 376/108
[58] Field of Search ...................................... 376/107, 108, 376/190, 194, 195, 199, 201; 250/281, 282

[56] References Cited

U.S. PATENT DOCUMENTS

| | | | |
|---|---|---|---|
| 4,568,509 | 2/1986 | Cvijanovich et al. | 376/109 |
| 4,826,646 | 5/1989 | Bussard | 376/107 |
| 5,101,105 | 3/1992 | Fenselau et al. | 250/281 |
| 5,152,955 | 10/1992 | Russell | 376/107 |
| 5,825,839 | 10/1998 | Baskis | 376/202 |

OTHER PUBLICATIONS

Burhop, "Atomic disintegration by particles of low energy", Proceedings of the Cambridge Philosophical Society, vol. 32, pp. 643–647, Jan. 1936.

*Primary Examiner*—Daniel D. Wasil
*Attorney, Agent, or Firm*—Thomas Schneck

[57] ABSTRACT

An apparatus for the creation and detection of high velocity alpha particles accompanied by one or two captured electrons. The apparatus is a modification of the well-known Cockcroft and Walton experiment used to disintegrate lithium-7 into high energy alpha particles by bombarding the lithium with high energy protons. The resulting alpha particles with captured electrons cannot be detected by normal helium absorption spectrum techniques and have other unique attributes.

2 Claims, 1 Drawing Sheet

METHOD AND APPARATUS FOR DETECTING HIGH VELOCITY ALPHA PARTICLES HAVING CAPTURED ELECTRONS

TECHNICAL FIELD

The present invention pertains to creation and detection of high velocity alpha particles having captured electrons.

BACKGROUND ART

The visible or luminous matter in the universe is approximately 76 percent hydrogen and 24 percent helium, by mass. Astrophysicists have shown that in order to account for certain motions of astronomical bodies there must be a very large amount of mass in the universe that has not been observed. This is called "dark matter" or "missing mass" and is estimated to represent 90 percent of the mass of the universe. The universe also appears to be electrically neutral with the same number of electrons as protons.

A valuable reference work providing background art relative to the invention is *Nuclear and Particle Physics* by W. S. C. Williams, Clarendon Press Oxford, 1991, particularly chapters 14, 13, and 11. In section 14.2, Big Bang Nucleosynthesis, it describes various nuclear reactions that began to take place 225 seconds after the Big Bang. The output of many of those reactions are alpha particles with kinetic energies of the order of 10 MeV. One of those nuclear reactions is:

$Li^7 + p \rightarrow \alpha + \alpha + 17.35$ MeV

About 106 years after the Big Bang, normal atoms began to form in the universe. Chapter 11 covers the subject of kinetic energy loss of charged particles by ionization of a metal's atoms by charged particles moving through the metals. The term "range" is defined as the distance moved by a charged particle through a metal before coming to rest. To determine the range for particular particles of a given energy, the number surviving various thicknesses of metal foils is measured. For alpha particles of energy up to tens of MeV, the survival rate is very nearly 100 percent until a certain thickness of a given material, after which the number of alpha particles drops to zero rapidly.

It is known that the ionization energy of the first electron removed from a stationary helium atom is 24.6 electron volts. When that electron is removed, it no longer partially shields the second electron from the two proton positive charge of the alpha particle nucleus and the second electron moves closer to the nucleus, resulting in an ionization energy for the lone electron of 54.4 electron volts.

The latest information about dark matter can be found in *Stephen Hawking's Universe* by David Filkin, Basic Books, a Division of Harper Collins Publishers, Inc., 1997, in chapters 8 and 9. After much research, astrophysicists have convincing evidence of dark matter. They have ruled out several possible sources of dark matter and are now focusing on weakly interacting, massive particles. Through the massive gravitational effects of dark matter, the existence of dark matter has been proven but its particle structure remains unknown as of the end of 1997.

In 1932, Cockcroft and Walton conducted experiments which demonstrated experimentally that beams of protons, with kinetic energy of only 120,000 eV, are capable of breaking up the nucleus of the lithium atom and thereby creating two high energy alpha particles, according to the nuclear reaction:

$Li^7 + p \rightarrow \alpha + \alpha + 17.35$ MeV

See *Atomic Physics* by Max Born, Dover Publications, Inc. 1969, page 71 and 73. Later experimenters disintegrated the lithium with protons down to less than 30,000 ev.

This same nuclear reaction is believed to have occurred in the universe during the Big Bang nucleosynthesis and since that time. The two alpha particles are known to be emitted in opposite directions to satisfy the conservation of momentum law.

A closely related reaction involving lithium-6 and deuterium also can be achieved on earth and produces even higher energy alpha particles:

$Li^6 + D \rightarrow \alpha + \alpha + 22.4$ MeV

It is an object of this invention to devise a method and apparatus to create and detect a structure of elementary particles that is weakly interacting, is difficult to detect by absorption spectrum techniques, and could be created in the universe by nuclear reactions known to have taken place there. Another object of this invention is to create a structure of particles that is a possible candidate for the dark matter of the universe and subject them to detection methods that can be used as a basis for understanding or detecting the dark matter of the universe. Another object of the invention is to create and detect highly energetic, partially neutralized beams of alpha particles for possible use for cancer treatments and possibly for medical imaging.

SUMMARY OF THE INVENTION

This object has been achieved with an apparatus for creation and detection of the sought after particles which uses a electron beam in a modification of the experiment of Cockcroft and Walton so as to allow electrons to be captured by the emitted 8.7 MeV alpha particles and then measuring how well the resultant particle structure penetrates thicker metal sheets than was achievable before the electrons were captured. In the Cockcroft and Walton apparatus, the number of bombarding protons greatly exceeded the number of protons leaving as part of the alpha particles, which comprise two protons and two neutrons. This abundance of protons bombarding the lithium in the Cockcroft/Walton experiment prevent the electrons in the lithium-7 from attaching themselves to the departing alpha particles. By bombarding the lithium-7 sample with a beam of electrons as well as the beam of protons, with an electron flux exceeding the proton flux, an excess of electrons is created causing some of the departing alpha particles to carry with them one or two electrons.

Captured electrons travel with the same high velocity as the alpha particles and therefore must fall through a much greater coulomb potential of the alpha particle than for the normal helium atom, whose nucleus is at rest. This closeness of the captured electron partially shields and neutralizes the positive charge of the alpha particle. When such a neutralized alpha particle bombards a metal sheet, its ionizing effect, and kinetic energy losses, are greatly diminished, allowing very much greater penetration into the metal sheet than possible by bombarding the same metal with ordinary alpha particles with the same kinetic energy.

The detection method of the present invention is based upon this difference in alpha particle penetration of a metal sheets located between the emitted alpha particles and a scintillation counter detector. A metal of a given thickness is selected such that only a small percentage of the ordinary alpha particles will pass through the metal sheets in front of the scintillation counter detector. The penetrating particles can be detected using a scintillation counter such as a zinc sulphide scintillation counter.

An electron beam is then turned on and directed at the lithium target to neutralize the positive charges from the proton beam and create an electron surplus. Some of the emitted alpha particles become partly neutralized by the tightly-bound captured electrons and pass through the metal sheets to be detected by the scintillation detector. The rise in the number of penetrating particles triggered by the electron beam will provide the detection method and will confirm the partial electron neutralization of the alpha particle positive charge. It should be noted that an ordinary helium atom bombarding the same metal sheets with the same kinetic energy would penetrate the metal sheets only slightly more than the alpha particles, because the weakly-bound orbital electrons of atomic helium would be quickly stripped away from the alpha particle nucleus.

It has been shown that for single electron atomic systems with a stationary nucleus that the Bohr classical physics approach yielded fairly accurate results. The Bohr energy states of the Bohr atom are derived for the hydrogen atom or single electron helium atom by setting the Coulomb attraction of the electron to equal the centrifugal force of the orbiting electron.

In the derivation of the energy states of the high velocity alpha particle-electron pair, relationships between velocities and energies are used, rather than equating the forces. For the high velocity alpha particle with an captured electron:

(1) The average linear velocity of the electron = the average linear velocity of the alpha particle.

That is, the electrons and alpha particles are traveling together at the same average velocity.

The kinetic energy of an electron, which has been accelerated by potential V is described by the following equation, where eV is measured in electron volts. All of the kinetic energy of the electron is assumed to be derived from falling toward the positively charged alpha particle.

$$v_{electron} = \sqrt{\frac{2eV}{M_{electron}}}$$

The kinetic energy of the alpha particle has no restrictions on it (essentially an independent variable) and is defined simply as Ealpha, measured in electron volts as Ealpha=½ Malpha $v^2$alpha and thus $$v_{alpha} = \sqrt{\frac{2E_{alpha}}{M_{alpha}}} \quad (3)$$

equating the electron and alpha particle average linear velocities (2) and (3) as required by (1) we arrive at $$eV = \frac{M_{electron}}{M_{alpha}} E_{alpha} = \frac{E_{alpha}}{7344} \quad (4)$$

This states that the energy of the captured electron, which is the same as the ionization potential, is equal to the kinetic energy of the alpha particle divided by 7344. This equation only accounts for the linear velocities and kinetic energies of the electron and alpha particle, but does not take into account the orbital kinetic energy of the electron. When the nucleus of a single electron helium atom is stationary its ionization energy is 54.4 electron volts, which should be added to the above equation to ensure that when the alpha particle kinetic energy falls to zero then eV equals 54.4 electron volts. For this case the electron can be considered to have a helical orbit represented by equation 5.

$$eV = \frac{E_{alpha}}{7344} + 54.4 \quad (5)$$

Equation (5) is very simple but very powerful in describing the many attributes of a high velocity alpha particle with a captured electron. Five of those attributes are described in the following five paragraphs. Paragraphs (a), (d) and (e) explain why normal absorption spectrum techniques would not be successful in detecting such particles.

(a) The higher the kinetic energy of the alpha particle, the larger the coulomb potential that the electron must fall through to gain sufficient speed, so the electron must move closer to the alpha particle the greater the alpha particle kinetic energy, Ealpha. In the case of an alpha particle-electron pair with a kinetic energy of 11.2 MeV, the ionization energy or chemical binding energy of an electron to the alpha particle is about 1,525 plus 54 or 1,579 electron volts (which corresponds with an x-ray ionization energy wavelength of about 8 A°.) and the distance of the electron to the alpha particle would be about the order of $4 \times 10^{-11}$ cm compared with the spacing of $2.64 \times 10^{-9}$ cm for the normal helium atom and about $1.2 \times 10^{-9}$ cm for a single electron helium atom. Thus, if there were a large number of identical alpha-particle electron pairs moving at the identical velocities they could be detected, theoretically, with x-ray quanta with a wavelength of 8 A°, which would ionize the electrons and thus x-ray quanta would be absorbed and thereby demonstrate an absorption spectra.

(b) Equation (5) holds for very high kinetic energies and velocities (v) of the two particles since for both Melectron and Malpha the masses vary with velocity as $$M = \frac{M(\text{rest})}{\sqrt{1 - \frac{v2}{c2}}}$$

(c) Equation (5) indicates at what kinetic energy of the alpha particle is the distance between electron and alpha particle one half of that for a helium atom with one electron that is in its ground state? The ionization energy of helium with one electron in its ground state is 54.4 electron volts. For this condition the ionization energy and kinetic energy of the electron would be 108.8 electron volts divided equally between the orbital energy and the linear energy. Therefore for the electron-alpha particle spacing to be halved, Ealpha= 7344 (54.4), or 400,000 eV. This means that to shield the alpha particle positive charge with an electron, the kinetic energy of the alpha particle must be very much greater than 400,000 eV so that the electron is much closer to the alpha particle.

(d) The eV of the electron travelling with an alpha particle is the same as the ionization energy. Since the ionization energy and the absorption spectrum are determined by the kinetic energy of the alpha particle, any large group of these alpha particles with companion electrons probably would, as a whole, have a wide range of kinetic energies and therefore would exhibit a broad band x-ray absorption spectra making them difficult to detect.

(e) If some captured electrons had some initial kinetic energy when they entered into the electric field of the alpha particles, their ionization energies would be different than for-zero-kinetic energy electron entries. This effect would further broaden the x-ray absorption spectra of the group of alpha particle-electron pairs, making them difficult to detect.

BEST MODE FOR CARRYING OUT THE INVENTION

Figure 1:
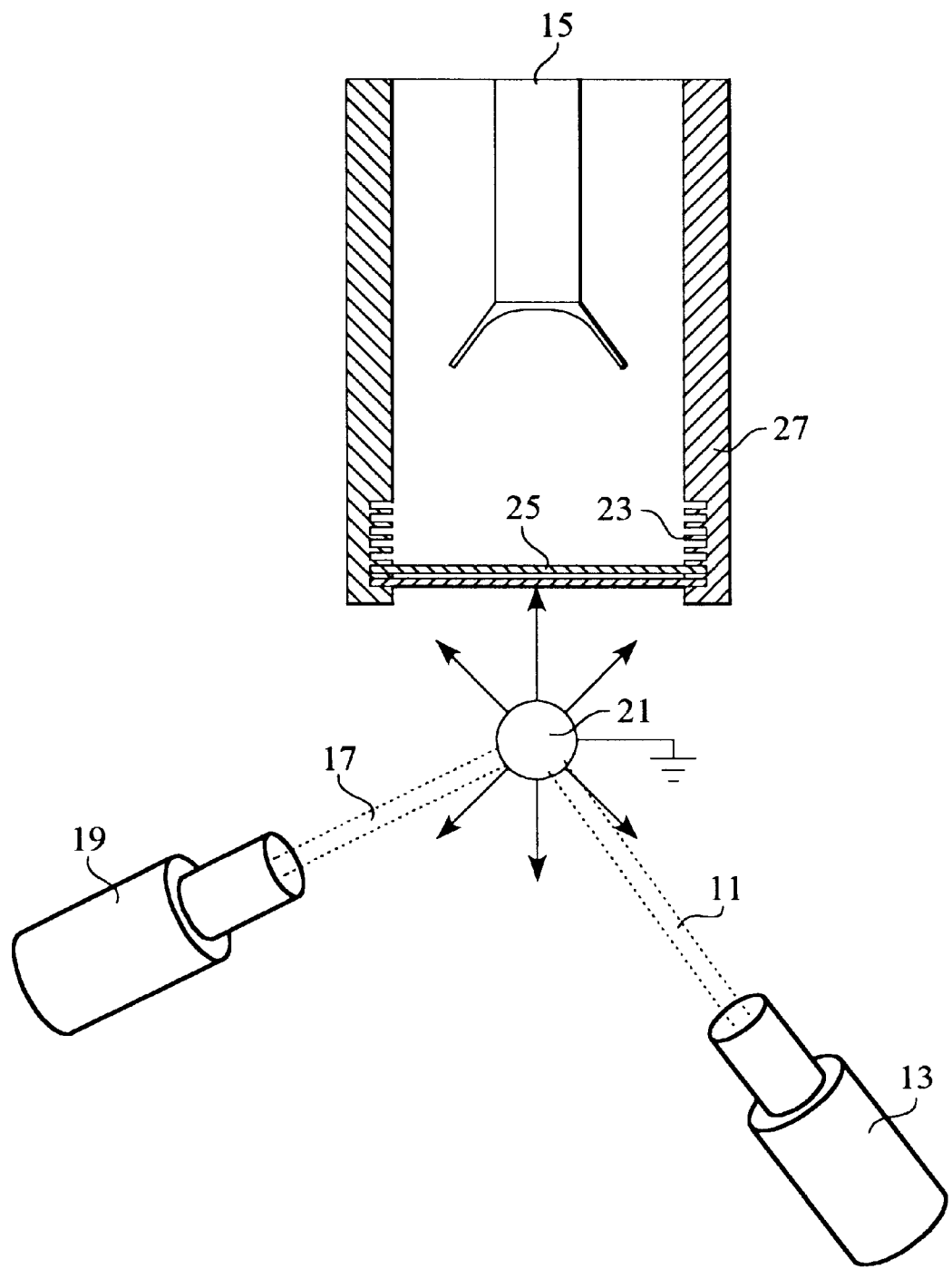
FIG. 1 is a plan view of apparatus of the present invention.

FIG. 1 shows an apparatus for creating alpha particles with a proton beam 11, with kinetic energy of greater than 30,000 eV and preferably between 80,000–160,000 eV, generated by a source 13 directed to the lithium target 21 according to the Cockcroft/Walton method. The apparatus further includes a scintillation detector 15 for detecting the alpha particles, an electron beam 17 from a conventional electron gun 19 emitting moderate energy, electrons, for neutralizing excess positive charge on the lithium target 21, and notches 23 for introducing metal sheets 25 between the alpha particle source, i.e. the lithium target 21 and the scintillation counter 15. Lithium target 21 is a sheet of primarily lithium-7, although a sheet of lithium-6 will also work if deuterons are substituted for protons. The preferred metal sheets are aluminum foils ranging in thickness between 70–300 $\mu$m. Sheets of other metals can also be used if they can be made and handled yet thin enough so that at least three sheets would be required to reduce the scintillation count by about a factor of ten. Scintillation detector 15 comprises a material which scintillates upon alpha particle impact, a photomultiplier that produces a pulse of current for each scintillation, and an associated counter which counts scintillations.

Initially, only the proton beam 11 is turned on to conduct the Cockcroft/Walton method for creating 8.7 MeV alpha particles, which emerge from lithium target 21 in random directions, alpha particles directed toward the scintillation detector 15 are detected by the scintillation material and counted. The electron beam 17 is not yet turned on.

Sheets 25 of metal, perhaps aluminum 100 to 200 microns thick, are inserted in the notches 23 in the scintillation counter housing 27 to reduce the kinetic energies of the alpha particles. A number of aluminum sheets are inserted until the scintillation count is reduced to about ten percent of the initial scintillation counter reading.

The electron beam 17 is then turned on at a low current level, and the scintillation counter reading is checked. The current in the electron beam striking the lithium target is slowly increased so as not to damage the lithium target. At some electron beam current level, the scintillation count will increase. This would imply that more alpha particles are reaching the scintillation detector, and the detection of partially neutralized alpha particles is confirmed. The electron beam flux should exceed the proton beam flux. The next two steps can be used for further confirmation.

An additional aluminum sheet is inserted, which should lower the scintillation count. When that happens, the electron beam current is raised to try to allow more of the generated alpha particles to capture electrons and thus cause greater penetration of the aluminum sheets and thus confirm the anticipated relationship between electron beam current and metal thickness penetration by the partially shielded alpha particles.

The above method distinguishes between (1) pure high kinetic energy alpha particles and (2) alpha particles with the same kinetic energy, accompanied by one or two electrons by the differences in penetrating power of the particles and their associated ionization losses in metals.

An alternate way of distinguishing between the two particle structures is to use a magnetic field orthogonal to the motion of the output alpha particles. A high velocity, positively charged alpha particle would be deflected much more by the orthogonal magnetic field than would the partially shielded alpha particle carrying one or two electrons. The orthogonal magnetic field would be in front of the scintillation counter, which would enable the scintillation counter to distinguish between the pure alpha particle and the partially shielded one. The magnetic field can be varied to adjust the beam deflection factor to an optimum level.

The high velocity alpha particle-electron(s) particle structure created by the method and apparatus described, could be called helical helium in describing the paths of the companion electron(s). It might be called a helium proto-atom since when those particles slow down from collisions and momentum transfer scatterings they will become a normal helium atom. It might be called a linear helium atom since the kinetic energy of the electron would be primarily based upon its linear velocity rather than its much smaller orbital velocity. It might be called hyper-velocity helium since its kinetic energy exceeds 400,000 electron volts. It might be called tightly-bound helium since the coulomb binding energy of the electron is between 100 to 1,500 electron volts. It might be called cosmic helium since it is rare on earth and probably plentiful in the cosmos. It might be called neutron-like helium since it can remain intact while passing through metal foils and also has a high collision cross-section when encountering positively charged nuclei, both characteristics common to neutrons. And finally, it might be called dark helium since photons that would normally ionize helium or excite helium would not lead to absorption of the photons or lead to light output from the dark helium. If dark helium was created after the Big Bang, could dark hydrogen, dark deuterium, dark tritium and dark lithium-7 be created in similar or in somewhat related ways. A study of the nucleosynthesis reactions, the prior period, and knowing that the electron and proton populations were equal and in extremely high density might lead to such a conclusion.

I claim:

1. A method of detecting high velocity alpha particles which have one or more captured electrons traveling with them comprising:

directing a beam of protons having kinetic energies with a proton flux ranging between 50,000 eV to 160,000 eV onto a target of primarily lithium-7, thereby producing alpha particles, placing a scintillation counter in a location intercepting at least some of the alpha particles, locating a holder of thin metal sheets of aluminum, each ranging in thickness between 70 $\mu$m and 300 $\mu$m in front of the scintillation counter, inserting said thin aluminum sheets in said holder until the scintillation count is reduced by a measurable amount, turning on a electron beam directed at said target of primarily lithium-7, with an electron beam flux exceeding the proton flux and slowly raising the electron current until the scintillation count increases.

2. A method of detecting high velocity alpha particles which have captured electron(s) traveling with them comprising:

directing a beam of deuterons having kinetic energies with a deuteron flux ranging between 50,000 eV to 160,000 eV onto a target of primarily lithium-6, thereby producing alpha particles, placing a scintillation counter in a location intercepting at least some of the alpha particles, locating a holder of thin metal sheets of aluminum, each ranging in thickness between 70 $\mu$m and 300 $\mu$m in front of the scintillation counter, inserting said thin aluminum sheets in said holder until the scintillation count is reduced by a measurable amount, turning on an electron beam directed at said target of primarily lithium-6, with an electron beam flux exceeding the deuteron flux, and slowly raising the electron current until the scintillation counter increases.

* * * * *